United States Patent
Maeda

(10) Patent No.: US 9,610,690 B2
(45) Date of Patent: Apr. 4, 2017

(54) ROBOT SYSTEM FOR SETTING MOTION MONITORING RANGE OF ROBOT

(71) Applicant: FANUC Corporation, Yamanashi (JP)

(72) Inventor: Keita Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/848,974

(22) Filed: Sep. 9, 2015

(65) Prior Publication Data

US 2016/0075025 A1    Mar. 17, 2016

(30) Foreign Application Priority Data

Sep. 16, 2014 (JP) ................. 2014-188023

(51) Int. Cl.
| | | |
|---|---|---|
| *B25J 9/16* | (2006.01) | |
| *B25J 19/06* | (2006.01) | |
| *B25J 13/06* | (2006.01) | |
| *G05B 19/4061* | (2006.01) | |

(52) U.S. Cl.
CPC ..... *B25J 9/1671* (2013.01); *G05B 2219/40479* (2013.01); *G05B 2219/40492* (2013.01); *Y10S 901/02* (2013.01); *Y10S 901/49* (2013.01)

(58) Field of Classification Search
CPC ...... B25J 9/1605; B25J 9/1666; B25J 9/1676; B25J 9/1671; G05B 2219/40478; G05B 2219/49137; G05B 2219/40492; G05B 2219/40479; G05B 19/4061

See application file for complete search history.

(56) References Cited

U.S. PATENT DOCUMENTS

| | | | | |
|---|---|---|---|---|
| 8,731,276 | B2 * | 5/2014 | Mizutani ................ | B25J 9/1676 345/633 |
| 2013/0116828 | A1 * | 5/2013 | Krause .................... | B25J 9/1605 700/264 |
| 2015/0151431 | A1 * | 6/2015 | Suyama ................. | B25J 9/1671 700/264 |

FOREIGN PATENT DOCUMENTS

| | | |
|---|---|---|
| JP | 10-161719 A | 6/1998 |
| JP | 2001-105359 A | 4/2001 |
| JP | 2005-81445 A | 3/2005 |
| JP | 2007-61983 A | 3/2007 |
| JP | 4750200 B2 | 8/2011 |
| JP | 2013-94961 A | 5/2013 |
| JP | 2014-217901 A | 11/2014 |
| KR | 20140015802 A * | 2/2014 |

* cited by examiner

*Primary Examiner* — Dale Moyer
(74) *Attorney, Agent, or Firm* — Hauptman Ham, LLP

(57) ABSTRACT

A robot system includes a display portion which displays a robot model and a peripheral device model, a deployment portion which deploys a motion monitoring range model of the robot on the display portion, a positioning portion which moves and positions the motion monitoring range model, and a setting portion which converts a range surrounded by the positioned motion monitoring range model in the display portion into coordinate values which can be recognized by the robot to set the motion monitoring range.

9 Claims, 5 Drawing Sheets

ROBOT SYSTEM FOR SETTING MOTION MONITORING RANGE OF ROBOT

RELATED APPLICATIONS

The present application claims priority to Japanese Application Number 2014-188023, filed Sep. 16, 2014, the disclosure of which is hereby incorporated by reference herein in its entirety.

BACKGROUND OF THE INVENTION

1. Technical Field

The present invention relates to a robot system which sets a motion monitoring range of a robot in which whether a control point or a focus part of the robot exists is checked.

2. Description of Related Art

In a factory or the like, a robot whose hand has a working tool attached thereto is used to carry out various works. In some cases, the robot whose hand holds a workpiece carries out various works. It is necessary to prevent the working tool, etc., from interfering with peripheral devices of the robot during the operation of the works.

In general, a control unit of a robot is provided with a motion monitoring function. If the control point or a focus part of the robot is deviated from a pre-set motion monitoring range, the motion of the robot is stopped in accordance with the motion monitoring function. As a result, it is possible to prevent the control point or focus part of the robot from colliding with a peripheral or surrounding device.

Such a motion monitoring range is displayed as a sphere model or a parallelepiped model on a teaching pendant or a display unit of a computer, together with a three-dimensional model of the robot, etc. Japanese Patent No. 4750200 discloses an apparatus in which a sphere model having a radius corresponding to a coasting distance is displayed on a display panel of the teaching pendant together with a robot model and a peripheral device model.

A motion monitoring range model as the sphere model or a parallelepiped model is set by inputting numerical values of an XYZ coordinate system. However, the inputting operation of the numerical values is troublesome and time-consuming.

Furthermore, it is relatively difficult to arrange the motion monitoring range model in a desired position by inputting the numerical values. If it is found that the motion monitoring range model set by inputting the numerical values and displayed in the display unit is deviated from a desired position, it is necessary to input the numerical values again to move the motion monitoring range model to a desired position.

Under these circumstances, it is an object of the present invention to provide a robot system which enables an operator to easily set a motion monitoring range model within a short period of time.

SUMMARY OF THE INVENTION

In order to achieve the object mentioned above, according to the first aspect of the invention, there is provided a robot system comprising a display portion which displays a robot model of a robot and a peripheral device model of a peripheral device surrounding the robot, a deployment portion which deploys a motion monitoring range model of a motion monitoring range of the robot on the display portion, a positioning portion which moves the motion monitoring range model deployed by the deployment portion to determine the position of the motion monitoring range model, and a setting portion which converts a range surrounded by the motion monitoring range model positioned by the positioning portion in the display portion into coordinate values which can be recognized by the robot in order to set the motion monitoring range.

According to the second aspect of the invention, in the robot system according to the first aspect of the invention, the positioning portion expands or reduces the motion monitoring range model.

According to the third aspect of the invention, in the robot system according to the first or second aspect of the invention, the motion monitoring range model deployed by the deployment portion includes at least one of a parallelepiped model, a sphere model, and a capsule-type model, and the positioning portion positions at least one of the parallelepiped model, the sphere model, and the capsule-type model as a motion monitoring range model.

According to the fourth aspect of the invention, in the robot system according to any one of the first to third aspects of the invention, the robot system further comprises a stop portion which stops the robot when a control point or a focus part of the robot model is deviated from the motion monitoring range.

The aforementioned object, features and advantages and other objects, features and advantages of the invention will become more apparent with reference to the detailed description of the representative embodiments of the invention illustrated in the accompanying drawings.

DETAILED DESCRIPTION OF THE INVENTION

Figure 1:
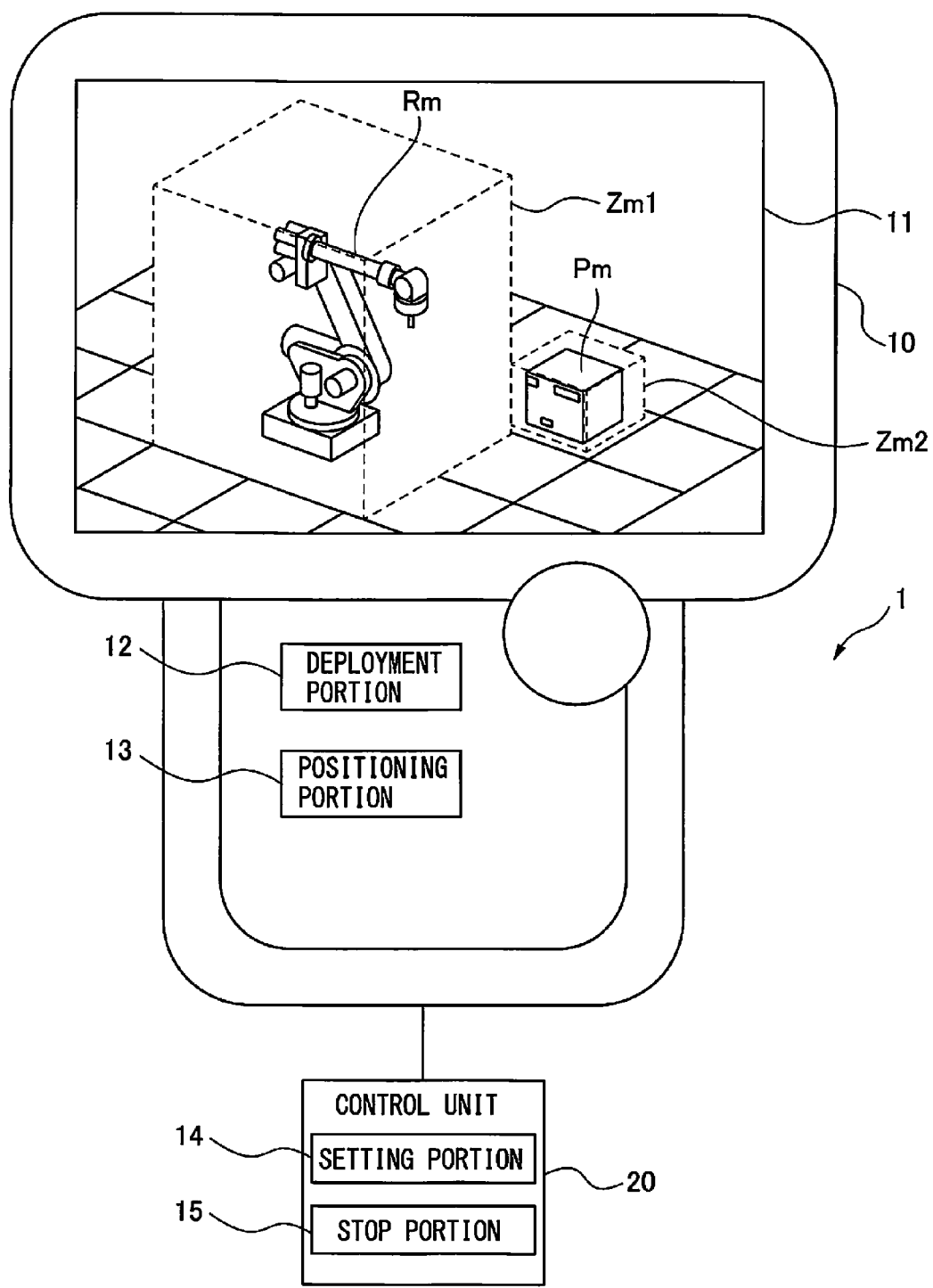
FIG. 1 is a schematic view showing a robot system according to the present invention.

Embodiments of the present invention will be discussed below with reference to the accompanying drawings.

In the drawings, the same or corresponding components are assigned same reference numerals. For clarity, the drawings appropriately have different scales.

FIG. 1 schematically illustrates a robot system according to the present invention. The robot system 1 shown in FIG. 1 is mainly composed of a teaching pendant 10, a robot control unit 20 connected to the teaching pendant 10. The robot control unit 20 controls the robot R (not shown) in accordance with the instructions supplied from the teaching pendant 10.

The teaching pendant 10 includes a display portion 11. As can be seen in FIG. 1, a robot model Rm of the robot R and a peripheral device model Pm of a peripheral device P surrounding the robot R are displayed in the display portion 11. The number and the type of the robot models Rm and the peripheral device models Pm, and the positional relationship therebetween correspond to those of the actual robots and peripheral devices.

As shown in FIG. 1, the teaching pendant 10 includes a deployment portion 12 which deploys the motion monitoring range model Zm of the motion monitoring range Z of the robot R on the display portion, and a positioning portion 13 which moves the motion monitoring range model Zm deployed by the deployment portion 12 and positions the motion monitoring range model Zm.

The motion monitoring range Z refers to a range in which the control point or specific focus part of the robot R performs a motion. In other words, the control point of the robot, etc., must be controlled to remain within the motion monitoring range Z. Alternatively, the motion monitoring range Z may be defined by a region in which the control point of the robot R, etc., is not permitted to enter, a region in which the speed of the control point of the robot R, etc., is limited, or a region in which when the control point of the robot R, etc., enters, a signal is output. In the following discussion, the region in which the control point of the robot R, etc., performs a motion is referred to as the motion monitoring range Z.

The robot control unit 20 is composed of a digital computer which controls the robot R. As can be seen in the drawings, the robot control unit 20 includes a setting portion 14 which converts the area surrounded by the motion monitoring range model Zm positioned by the positioning portion 13 in the display portion 11 into coordinate values which can be recognized by the robot R and sets the motion monitoring region Z.

Figure 2:
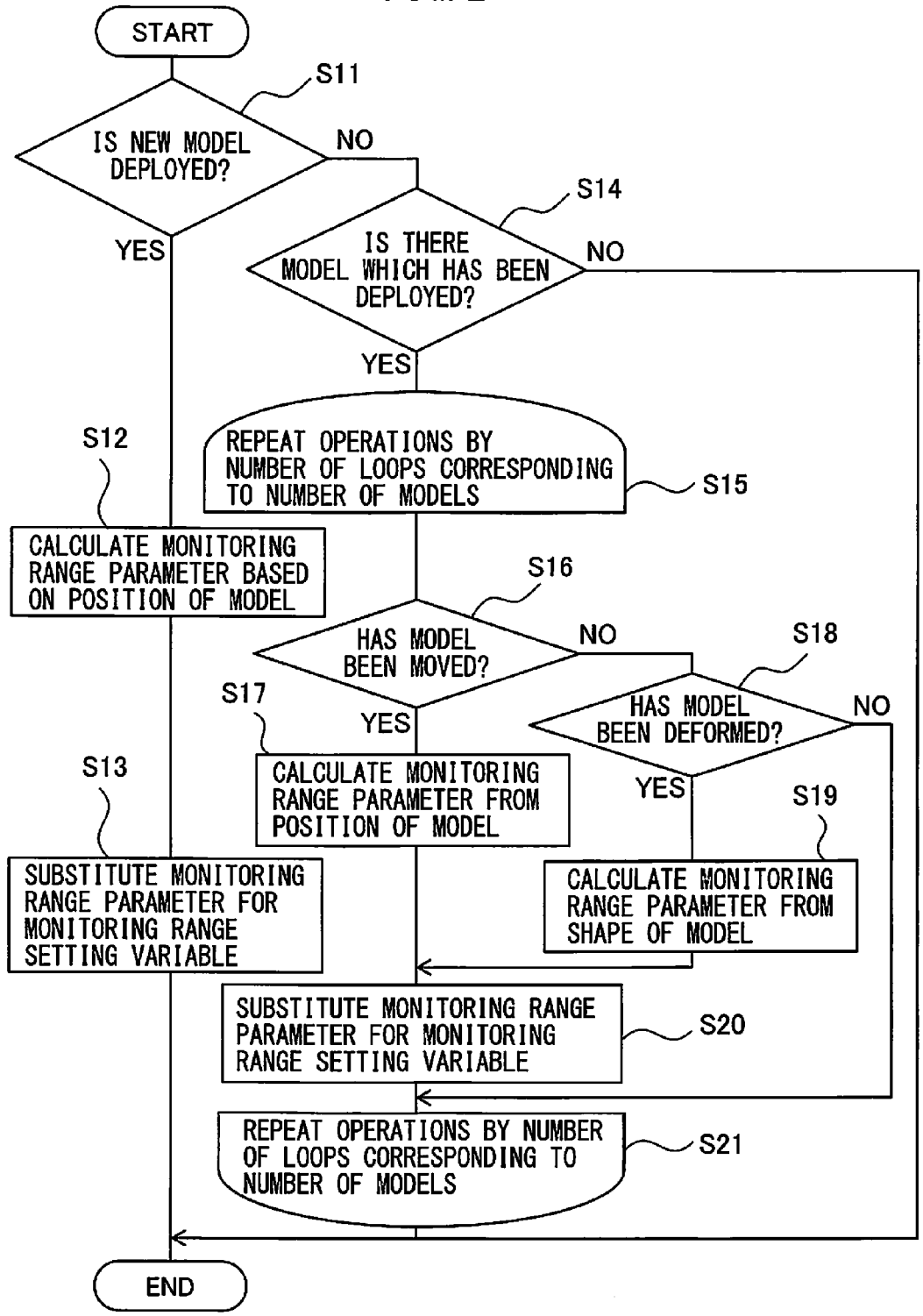
FIG. 2 is a flow chart of the operation of the robot system according to the present invention.

FIG. 2 illustrates a flow chart of the operation of the robot system. The operation of the robot system 1 according to the present invention will be discussed below with reference to FIG. 2. Note that, in the following discussion, it is assumed that the robot model Rm and the peripheral device model Pm are already displayed in the display portion 11 as shown in FIG. 1 and that the operations shown in FIG. 2 are repeatedly performed at a predetermined control cycle.

Figure 3A:
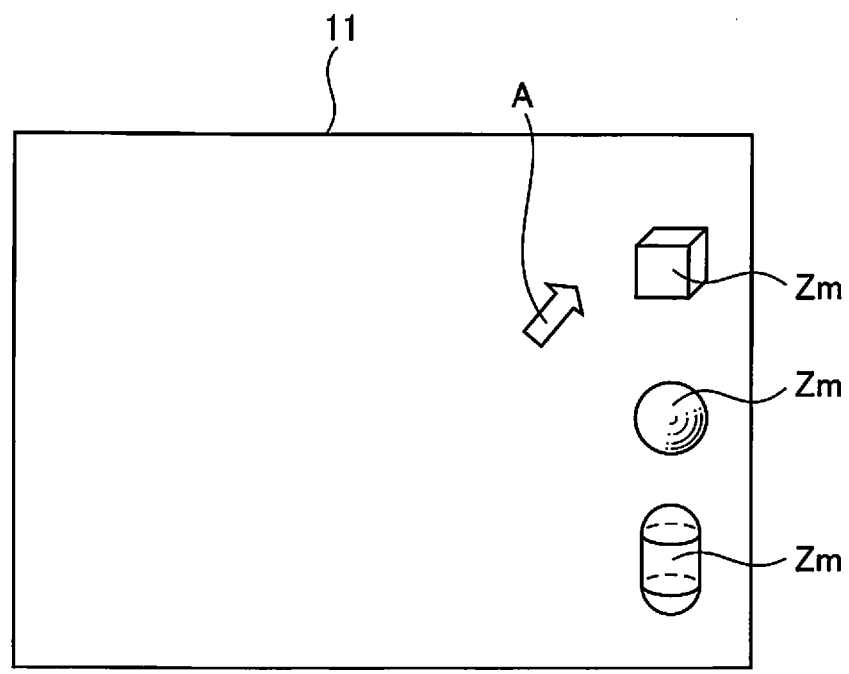
FIG. 3A is a first enlarged view of a display portion on which a motion monitoring range model is arranged.
Figure 3B:
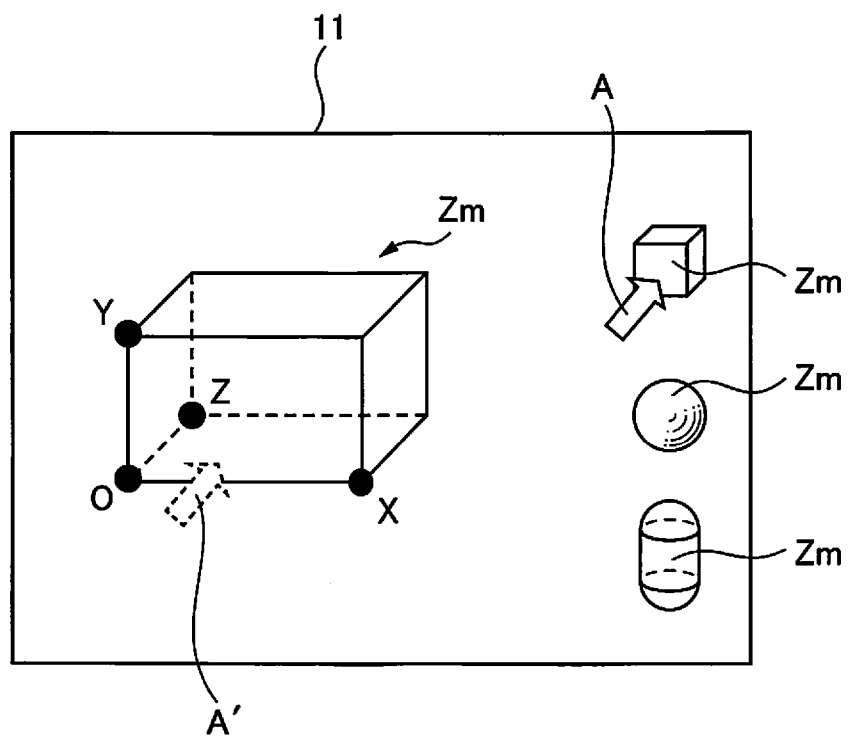
FIG. 3B is a second enlarged view of a display portion on which a motion monitoring range model is arranged.

First, at step S11, whether a new motion monitoring range model Zm is deployed in the display portion 11 is checked. FIGS. 3A and 3B are enlarged views of the display portion. For the sake of clarity, the illustrations of the robot model Rm and the peripheral device model Pm are omitted from FIGS. 3A and 3B and FIG. 4 which will be discussed hereinafter.

In FIG. 3A, the parallelepiped motion monitoring range sample model Zm, the sphere motion monitoring range sample model Zm, and the capsule-type motion monitoring range sample model Zm are displayed in the right end of the display portion 11. One of these sample models is selected by a pointer "A" and the selected motion monitoring range model Zm is deployed at a predetermined position of the display portion 11 by the deployment portion 12.

Moreover, as can be seen in FIG. 3A, the pointer "A" is indicated in the display portion 11 by the positioning portion 13. The operator operates the positioning portion 13 to move the pointer "A" to a desired position in the display portion 11. To this end, the positioning portion 13 may include a mouse or a track ball, etc.

The operator moves the pointer "A" onto one of the motion monitoring range sample models Zm located at the right end portion of the display portion 11, e.g., the parallelepiped motion monitoring range sample model Zm, and performs a predetermined operation, e.g., a click. As a result, the parallelepiped motion monitoring range model Zm is selected, and another motion monitoring range model Zm having the same shape is displayed with a predetermined scale at a predetermined position in the display portion 11, as can be seen in FIG. 3B.

Note that, it may be possible for the operator to touch a desired motion monitoring range sample model Zm located at the right end portion of the display portion 11 in order to display the separate motion monitoring range model Zm. Alternatively, it is also possible to deploy a desired motion monitoring range sample model Zm located at the right end portion of the display portion 11 merely by a drag operation of the pointer "A".

As a matter of course, it is possible to select the other types of motion monitoring range models Zm, for example, the sphere or capsule-type motion monitoring range model Zm by the use of the pointer "A". The selection of the motion monitoring range models Zm is determined by the operator in accordance with the shape, number or type of the robot models Rm and the peripheral device models Pm. Therefore, the operator can select an optimum motion monitoring range model Zm, which is most suitable for the shapes of the robot R and the peripheral device P.

When the selected motion monitoring range model Zm is newly displayed in the display portion 11, it is judged at step S11 that a new motion monitoring range model has been deployed. In this case, the control proceeds to step S12.

At step S12, the setting portion 14 calculates motion monitoring region parameters based on the position of the motion monitoring range model Zm. The separately displayed motion monitoring range model Zm is assigned a plurality of reference parts in advance.

As can be seen in FIG. 3B, in the case of the parallelepiped motion monitoring range model Zm, four points consisting of the central point O and three points X, Y, and Z which are located at the distal ends of the sides of the parallelepiped extending in the directions X, Y and Z from the central point O are set as the reference parts. At step s12, the setting portion 14 calculates the coordinate values of the plurality of reference parts in the XYZ coordinate system as parameters for setting the motion monitoring range.

In the case of a sphere motion monitoring range model Zm, the central point thereof and the radius of the sphere are set as the reference parts. In the specification of the present application, the capsule-type is composed of a cylindrical column and semispheres arranged at both ends of the column. In the case of a capsule-type motion monitoring range model Zm, the central points of both end faces of the column and the radius of the semispheres are set as the reference parts.

Then, at step S13, the setting portion 14 substitutes the motion monitoring range parameters for the motion monitoring range setting variables. Thus, the area surrounded by the motion monitoring range model Zm in the display portion 11 is converted to the coordinate values which can be recognized by the robot R, and consequently, the motion monitoring range Z is set.

At step S11, if it is judged that a new motion monitoring range model Zm is not deployed, the control proceeds to step S14. At step S14, whether there is a motion monitoring range model Zm which has been deployed in the display portion 11 is checked. If such a motion monitoring range model does not exist, the control ends. Conversely, if a motion monitoring range model Zm which has already been deployed exits, the operations between steps S15 and S21, i.e., the operations from step S16 to step S20, which will be discussed hereinafter, are repeated, wherein the number of repetitions corresponds to the number of the models.

At step S16, whether the motion monitoring range model Zm has been moved is checked. The operator can move the motion monitoring range model Zm to a desired position in the display portion 11 by dragging operation as shown by the pointer "A'" indicated by the dotted arrow in FIG. 3B.

Figure 4:
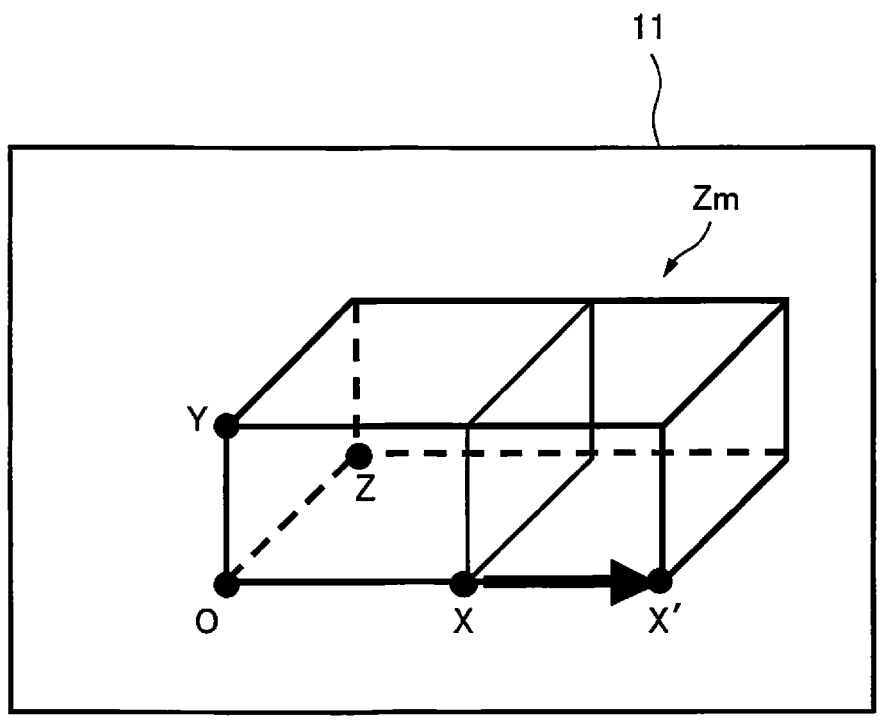
FIG. 4 is another enlarged view of a display portion.

If it is judged that the motion monitoring range model Zm has been moved at step S16, the control proceeds to step S17. Conversely, if it is judged that no movement of the motion monitoring range model Zm has occurred at step S16, the control proceeds to step S18 at which whether the motion monitoring range model Zm has been deformed is checked. Here, FIG. 4 is another enlarged view of the display portion. In FIG. 4, the operator deploys the pointer "A" on the point X of the motion monitoring range model Zm and drags the pointer "A" to the point X'. As a result of the dragging operation, the parallelepiped motion monitoring range model Zm is enlarged in the direction X, thus resulting in an enlargement of the motion monitoring range.

Likewise, it is possible to deform and reduce the motion monitoring range model Zm in the direction X by a similar dragging operation, although this is not illustrated in the drawings. Furthermore, it is possible to enlarge or reduce the parallelepiped motion monitoring range model Zm in the directions Y and Z. The motion monitoring range model Zm may be enlarged or reduced in at least two directions among the directions X, Y and Z.

The aforementioned operations for the movement and/or the deformation make it possible to deploy a desired shape of motion monitoring range model Zm at a desired position. For example, as can be seen in FIG. 1, the motion monitoring range model Zm1 has been moved and deformed so as to include the robot model Rm and its motion monitoring range, and the motion monitoring range model Zm2 has been moved and deformed so as to include the peripheral device model Pm.

As may be understood from the foregoing, if the motion monitoring range model Zm has been moved or deformed, the motion monitoring range parameter is calculated based on the position of the moved or deformed motion monitoring range model Zm at steps S17 and S19, as mentioned above. Thereafter, at step S20, the motion monitoring range parameter is substituted for the motion monitoring range setting variable. As a result, the motion monitoring range Z is set as mentioned above.

As mentioned above, according to the present invention, the motion monitoring range model Zm deployed in the display portion 11 is moved to a desired position and then the motion monitoring range is set. Therefore, it is possible to visibly set the motion monitoring range Z. Accordingly, in the present invention, it is not necessary for the operator to input coordinate values of the XYZ coordinate system, and hence, the motion monitoring range Z can be easily set within a short period of time. Therefore, in the present invention, it is possible to easily create an operation program of the robot in which the motion monitoring range Z is reflected.

With reference to FIG. 1, the robot control unit 20 includes a stop portion 15 which is adapted to stop the robot R when the control point or focus part of the robot model Rm is deviated from the motion monitoring range Z.

Figure 5A:
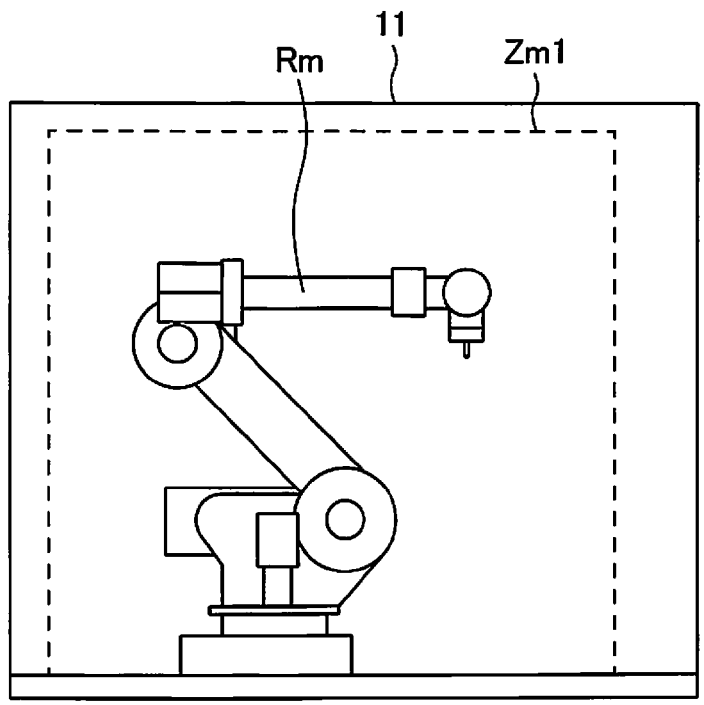
FIG. 5A is a first enlarged view of a display portion illustrated in FIG. 1.

After the operation program has been created, the operation program is simulated or the robot R is actually operated in accordance with the operation program. As shown in FIG. 5A which is an enlarged view of the display portion, normally, the robot model Rm is arranged within the motion monitoring range model Zm.

Figure 5B:
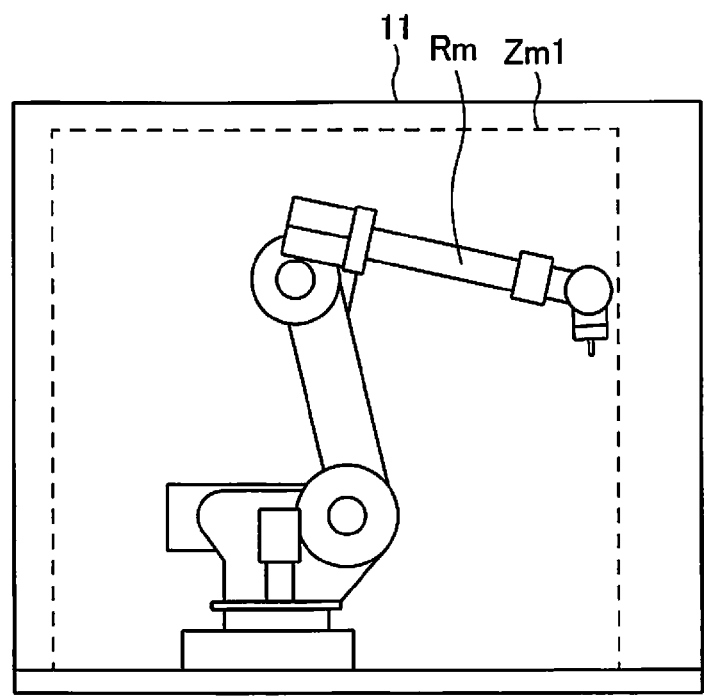
FIG. 5B is a second enlarged view of a display portion illustrated in FIG. 1.

However, as shown in FIG. 5B, the control point or the focus part, e.g., the front end of the robot model Rm may be deviated from the motion monitoring range Zm. If the deviation occurs, the stop portion 15 stops the robot R. Consequently, it is possible to prevent the control point or focus part of the robot R from colliding with the peripheral device P.

In different embodiments which are not illustrated in the drawings, the teaching pendant 10 may include the setting portion 14 and the stop portion 15 or the robot control unit 20 may include the deployment portion 12, the positioning portion 13, the setting portion 14, and the stop portion 15. Alternatively, a separate display (not shown) connected to the robot control unit 20 may be used in place of the display portion 11 of the teaching pendant 10. These modifications are included in the scope of the present invention.

Effects of the Invention

According to the first aspect of the invention, as the motion monitoring range model itself which is displayed in the display portion, is moved to an appropriate position, it is possible to visibly set the motion monitoring range. Therefore, it is not necessary for the operator to input the numerical values of the XYZ coordinate system, and accordingly, the motion monitoring range can be easily set within a short period of time.

According to the second aspect of the invention, it is possible to set the motion monitoring range which is further suitable for the robot and the peripheral devices by deforming the motion monitoring range model to enlarge or reduce the size thereof.

According to the third aspect of the invention, it is possible to select the optimum motion monitoring range model which is most suitable for the shapes of the robot and the peripheral devices from the parallelepiped model, the sphere model and the capsule-type model.

According to the fourth aspect of the invention, it is possible to prevent the control point or focus part of the robot from colliding with peripheral devices.

Although the invention has been discussed above with reference to the representative embodiments, it will be understood that a person skilled in the relevant art would be able to perform the aforementioned modifications and other various modifications, deletions and additions without departing from the scope of the invention.

What is claimed is:

1. A robot system, comprising:
   a display configured to
      display a robot model of a robot and a peripheral device model of a peripheral device surrounding the robot,
      display a deployed motion monitoring range model of a motion monitoring range of the robot, and
      display the deployed motion monitoring range model being moved by a drag operation to determine a position of the deployed motion monitoring range model, and
   a computer connected to the display and configured to convert a range surrounded by the deployed motion monitoring range model positioned in the display into coordinate values recognizable by the robot in order to set the motion monitoring range of the robot.

2. A robot system according to claim 1, wherein the display is configured to display the deployed motion monitoring range model being expanded or reduced by a drag operation.

3. A robot system according to claim 1, wherein the display is configured to display a plurality of motion monitoring range models including at least one of a parallelepiped model, a sphere model, and a capsule-type model, and display a selected one of the plurality of motion monitoring range models as the deployed motion monitoring range model.

4. A robot system according to claim 1, wherein the computer is configured to stop the robot when a control point or a focus part of the robot model is deviated from the deployed motion monitoring range model.

5. A robot system according to claim 3, wherein the deployed motion monitoring range model is the parallelepiped model.

6. A robot system according to claim 3, wherein the deployed motion monitoring range model is the sphere model.

7. A robot system according to claim 3, wherein the deployed motion monitoring range model is the capsule-type model.

8. A robot system according to claim 1, wherein the deployed motion monitoring range model is a model of a range in which a control point or a specific focus part of the robot performs a motion.

9. A robot system according to claim 1, wherein the deployed motion monitoring range model is a model of a region in which when a control point of the robot enters, a signal is output.

* * * * *